UNITED STATES PATENT OFFICE.

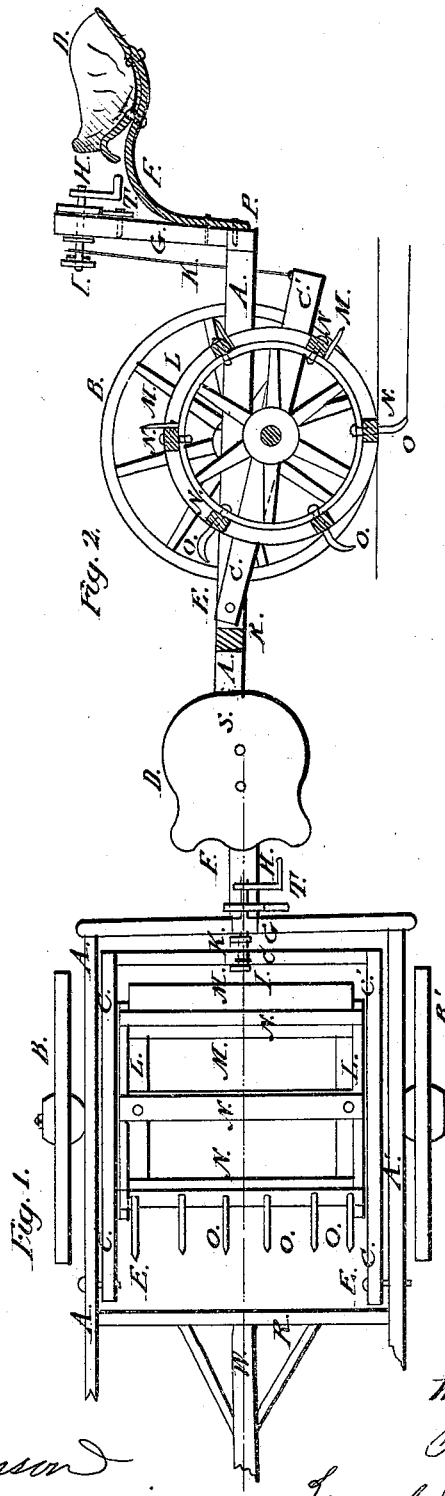

JAMES G. JOHNSON, OF CARTHAGE, ILLINOIS.

IMPROVEMENT IN CULTIVATORS AND STALK-CUTTERS.

Specification forming part of Letters Patent No. 92,834, dated July 20, 1869.

*To all whom it may concern:*

Be it known that I, J. G. JOHNSON, of Carthage, county of Hancock, and State of Illinois, have made a new and useful invention of Improved Meadow - Cultivator and Stalk - Cutter; and I do hereby declare the following to be a full, clear, and exact description thereof, reference being had to the accompanying drawings, and to the letters of reference marked thereon, in which—

Figure 1 is a top plan or view of my machine; and Fig. 2 is a side elevation of same, as seen from a sectional line, W S, dotted, in Fig. 1.

It is designed to have two sets of the parts bearing the prongs O O and the cutting-edges M M—one set of each—either kind to be used as may be proper for the respective purposes indicated.

The subject of this invention is an apparatus designed for use both in cutting cornstalks and in the cultivation or scarifying of the surface of meadows and such like uses by a slight exchange of parts.

The apparatus is made as shown in the drawings, and set forth hereinafter in general.

A frame, A A', is mounted on wheels B B', and may be attached to a team for drawing over the fields, and has a driver's seat, D, at its back end. This frame A A' has another frame, C C', within it and between the wheels B B'. The frame C C' is hinged at its forward end to the frame A A', at E E, so as to float freely up and down at its back end in passing along. In this frame C C' is hung a frame, roller, or cylinder, L, which has bars N N N along its sides, in line with its axis, at suitable distances apart. These bars N N N are made removable by screws or bolts to the these bars—one set with cutter-blades M M, wheel, and it is designed to have two sets of projecting, to cut the corn-stalks and for such like uses, and the other set to have rows of prongs O O O to be driven into the soil, and curved backward and with sharpened points to tear the soil when thrown up by the turning of the roller for scarifying or cultivating the surface of meadows and such like uses. The weight of the inside frame, C C', and wheel L is borne by the cutters or prongs in use to drive them down for their operation, while, if desired, the driver can rest his weight on the back end of the frame C C' to assist; and otherwise the weight of the driver and frame A A' is borne on wheels B B'. A chain, K, from the back end of frame C C' runs up to a small windlass, I, on top of a post, G, on the frame A A', before the driver, so that the driver can turn the crank H to the windlass, and raise the back end of the frame C C' and the roller from the ground or drop it for work.

A pawl and ratchet can be arranged at T, so as to hold the windlass I up when wound up, and various modifications may be adopted.

What I claim is—

The construction of the machine herein described, consisting of the combination outer frame, A, hinged frame C', roller L, cutters M M, and prongs O O, whereby I am enabled to furnish in one machine a cornstalk - cutter which, by a slight interchange of parts, as set forth, may be used as a meadow-cultivator, substantially as specified.

JAMES G. JOHNSON.

Witnesses:
SAMUEL JACOB WALLACE,
THOMAS H. GOODWIN.